(12) United States Patent
Allday (10) Patent No.: US 6,505,980 B1
(45) Date of Patent: Jan. 14, 2003

(54) SYSTEM AND METHOD FOR PRINTING SEQUENCES OF INDICIA

(75) Inventor: Nik Allday, Oxfordshire (GB)

(73) Assignee: Silver Fox Limited, Hertfordshire (GB)

( * ) Notice: Subject to any disclaimer, the term of this patent is extended or adjusted under 35 U.S.C. 154(b) by 0 days.

(21) Appl. No.: 09/506,203

(22) Filed: Feb. 12, 2000

(30) Foreign Application Priority Data

Feb. 12, 1999 (GB) ............................................. 9903074

(51) Int. Cl.$^7$ ................................................. B41J 5/30
(52) U.S. Cl. ........................ 400/61; 101/483; 707/507; 358/1.15; 358/1.18
(58) Field of Search ............................. 101/483, 93.01, 101/93.4; 400/61, 68, 70; 382/253, 305, 306; 379/157; 707/6, 102, 103, 506, 507; 358/1.15, 1.18; 710/20

(56) References Cited

U.S. PATENT DOCUMENTS

| | | | | | |
|---|---|---|---|---|---|
| 4,718,784 A | * | 1/1988 | Drisko | ........................ | 400/68 |
| 4,875,174 A | * | 10/1989 | Olodort et al. | ............. | 707/507 |
| 4,939,674 A | * | 7/1990 | Price et al. | ................ | 101/93.4 |
| 5,467,433 A | * | 11/1995 | Lamprecht et al. | ........ | 358/1.15 |
| 5,559,934 A | * | 9/1996 | Ogura et al. | .................. | 400/61 |
| 5,621,864 A | * | 4/1997 | Benade et al. | ............. | 358/1.18 |
| 5,659,603 A | * | 8/1997 | Orlofsky | ..................... | 379/157 |
| 5,841,954 A | * | 11/1998 | Ackley | .................... | 101/93.01 |
| 5,852,825 A | * | 12/1998 | Winslow | ..................... | 707/6 |
| 5,857,789 A | * | 1/1999 | Day et al. | ..................... | 400/70 |
| 5,930,810 A | * | 7/1999 | Farros et al. | ............... | 707/506 |
| 5,967,675 A | * | 10/1999 | Hastings et al. | ............. | 400/61 |
| 5,999,664 A | * | 12/1999 | Mahoney et al. | ........... | 382/305 |
| 6,009,424 A | * | 12/1999 | Lepage et al. | ................. | 707/6 |
| 6,014,674 A | * | 1/2000 | McCargar | .................... | 707/202 |
| 6,061,690 A | * | 5/2000 | Horl et al. | ................... | 707/103 |
| 6,154,572 A | * | 11/2000 | Chadda | ........................ | 382/253 |
| 6,154,792 A | * | 11/2000 | Giordano et al. | ............. | 76/20 |
| 6,167,406 A | * | 12/2000 | Hosuins et al. | ............. | 707/102 |
| 6,208,771 B1 | * | 3/2001 | Jared et al. | .................. | 382/306 |
| 6,215,910 B1 | * | 4/2001 | Chaddha | ..................... | 382/253 |

* cited by examiner

Primary Examiner—Eugene Eickholt
(74) Attorney, Agent, or Firm—Roberts Abokhair & Mardula, LLC (57) ABSTRACT

A printing system, for instance, for printing labels makes use of one or more sequence generators (13, 14; 113, 114) which can return an indicium definition in response to an input value. Typically, the input value is a sequence position, modified by step and repeat values. The sequence generators (13, 14; 113, 114) are used during the printing operation, avoiding the need for the data source file required in conventional mail merge and label printing systems.

45 Claims, 6 Drawing Sheets

SYSTEM AND METHOD FOR PRINTING SEQUENCES OF INDICIA

FIELD OF THE INVENTION

The present invention relates to a system for printing sequences of indicia. More particularly the present invention is a system and method for printing labels wherein the indicia can vary over the printing sequence.

BACKGROUND TO THE INVENTION

Many situations arise in which a sequence of indicia needs to be printed. The indicia may comprises textual or graphical matter. One example familiar to many is the printing of form letters by a mail merge process. Typically, a mail merge process comprises generating a template document including the static text of the form letter and placeholders for variable data. The variable data is stored in some form of list in a separate data source file. The form letters are produced by repeatedly inserting the next set of variable data in the data source file into a respective copy of the template document at the places specified by the place holders until the end of the data source file is reached.

A problem with the mail merge process, which is particularly acute in the case of label generation, is that the data source file must be produced before any individual merged document can be viewed or printed. Furthermore, the data source file must be wholly rebuilt and saved to disk before the form letters, labels etc. can be previewed or printed.

This basic process has also been used for the generation of labels. Examples are described in U.S. Pat. No. 4,939,674 and U.S. Pat. No. 5,621,864. Other patents have been issued for invention relating to label printing. For example:

U.S. Pat. No. 5,995,985 describes a software system which allows the user to select and arrange fields and images on series of labels to be printed. The user selects a specific label template. On each label the user may place text, graphics, or stamps, by using the drag and drop buttons. The user may insert fields against templates, which reference to a database.

U.S. Pat. No. 5,659,603 describes a system for creating a template and printing a label sheet for individual telephone numbers and features.

U.S. Pat. No. 5,621,864 describes a system for printing labels that have both varied templates and varied indicia fields. This system provides the user with the ability to vary the sequence of information displayed in indicia fields.

U.S. Pat. No. 5,967,675 describes the tape printer which allows the user to change the layout parameters of a label to be printed. The user may vary type face features, the type of bar code symbol to be printed, and the information to be printed on the label U.S. Pat. No. 5,857,789 describes an apparatus for printing bar code information on a tape. The display cannot show both text data and graphic data at the same time nor can the device is be adapted for array printing U.S. Pat. No. 5,841,954 describes a printer that can print both alphanumeric characters and bar codes on a label. Software provides printing instructions for the correct size of a bar corresponding to a number in a bar code.

U.S. Pat. No. 5,467,433 describes an apparatus which allows a user to make his or her own software program for label printing. The user may build specific programs separately and then execute a series of linked programs, in order to achieve an overall desired product.

Patent No. DE4228576 to Schwille describes computer software which allows a user to improve both text and graphic image on a label.

European Patent No. WO9729957 to Liedtke describes software which creates labels with text and graphic data. Labels of a variety of sizes may be printed on one label sheet. Further, labels containing both text and graphic images are shown U.S. Pat. No. 5,930,810 describes a system for designing a variety of document types and printing to either a local or a remote printer. A template is provided for the user, such as business card or a certificate. Graphic files are available for the user to define pictures and text to be shown on the desired product.

U.S. Pat. No. 4,718,784 describes a computer system for printing a sheet of labels where each label may contain multiple text strings and multiple graphic images. This system uses a graph table which tracks the position of printable pixels for each label.

U.S. Patent No. 4,875,174 describes a computer peripheral that accesses software and data stored on the host computer in order to print labels without interrupting other host computer functions.

U.S. Pat. No. 4,939,674 describes an apparatus for sequential labeling. The apparatus allows a user to designate a label of any size and shape. A user may place fields on each label containing either text or graphic files. Control software provides predefined templates or the ability to create custom templates. In this case, this patent does disclose applying a sequence with a user template.

U.S. Pat. No. 5,559,934 describes an apparatus for printing labels which automatically optimizes characters to fit within the printable range of a specific label. The apparatus stores template information, standard label sheets, and label positions.

Given the flexibility in printing that is required in today's communications, what would be useful is a system that applies a printing sequence that can be flexibly designated via a user template, applying a sequence with a cog and wheel counter algorithm, using a counter to reference an image to be inserted in a field, and streaming print instructions by a parent/child hierarchy thereby avoiding the need for the data source file required in conventional mail merge and label printing systems.

SUMMARY OF THE INVENTION

According to the present invention, there is provided a system for displaying a sequence of indicia, the system comprising:

indicia selection means; and output means for producing command signals for a display apparatus, characterised in that the indicia selection means includes a list whose members each define an indicium and is configured to perform a process for selecting a member of said list in dependence on a supplied index value derived from an ordinal value related to a display region in which an indicium in said list is to be displayed, and the output means is configured for generating and supplying said values to said process for selecting list members and generating display apparatus control signals for displaying the indicia defined by the selected list members.

According to the present invention, there is also provided a method of producing a display of an indicium in a sequence of indicia, the method comprising:

selecting an indicium definition from a list of indicium definitions in dependence on a supplied index value derived from an ordinal value related to a display region in which the indicium is to be displayed; and producing display apparatus control signals for causing a display device to display the indicia defined by the selected definition.

With regard to the term "indicium", a blank space is an "indicium" if it is to be printed in response to said selection process.

Thus, the present invention avoids the data source file employed in the prior art for sequences of indicia. Furthermore, the indicia selection means can be used to obtain an indicium out of sequence, e.g. for individual preview, without having to search through a file of indicia.

Most usefully, the display apparatus control signals are printer control signals as this enables labels, for example, to be printed. However, it is desirable that the indicia be displayed on a screen, e.g. a computer screen, before the user commits to printing them.

Preferably, the indicia selection makes use of a software object including the list of variables and a method for obtaining a position in said list in dependence on said supplied value. More preferably, this object comprises a further list of variables, each defining an indicium, said lists of variables are ordered, and the method can selectively obtain a position in said further list in dependence on a supplied value.

The lists need not be the same length.

The selection of an indicium preferably comprises, for each list until the list before that from which a position is required, assigning the result of N div "the length of the current list" to N and then obtaining the result of N mod "the length of the list from which the position is required" as the required position, where N is initially the supplied value.

Preferably, the ordinal value is the position of a display region in an array of display regions. However, it could relate to a temporal position.

The present invention has particular application in the printing and display of labels.

Preferably, step and repeat values associated with a label group are stored and the supplied value is derived from the ordinal value and the relevant step and repeat values.

The present invention may be implemented using a conventional computer. Since the economic exploitation of the present invention will often involve the distribution of control software, protection is sought for a manifestation of a signal representing a program for controlling a computer to perform a method according to the present invention. The manifestation may comprise an electromagnetic wave or a spatial variation in a physical property, such as magnetic field direction or reflectance.

DETAILED DESCRIPTION OF THE PREFERRED EMBODIMENT

An embodiment of the present invention will now be described, by way of example, with reference to the accompanying drawings.

In the following description, terminology appropriate for Microsoft Windows programming will be employed as these are familiar to a large number of programmer. However, it will be appreciated that the present invention is not restricted in its application to Microsoft Windows platforms.

Figure 1:
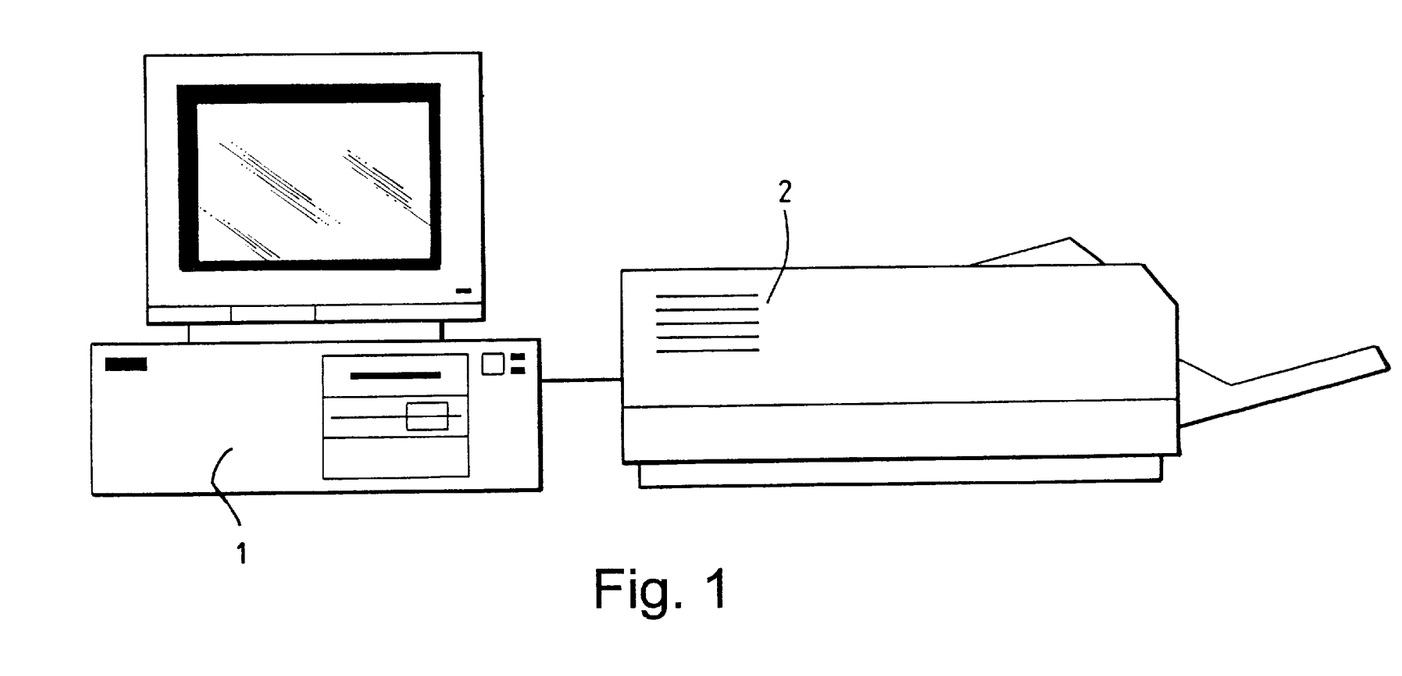
FIG. 1 shows the hardware of an embodiment of the present invention.

Referring to FIG. 1, a label printing system is implemented using a personal computer 1 and a printer 2 connected to the personal computer 1 for receiving printing instructions therefrom.

Figure 2:
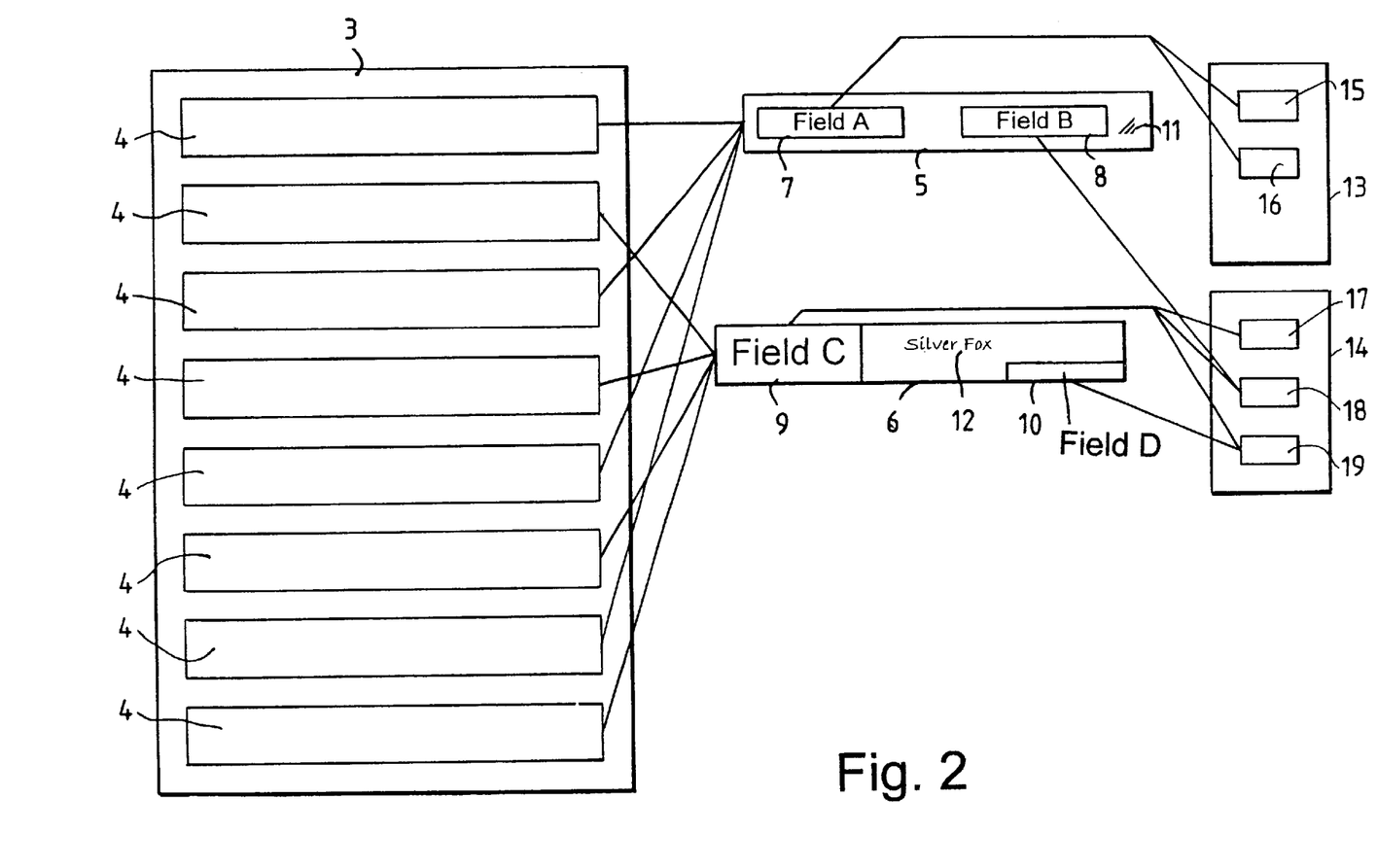
FIG. 2 is a block diagram illustrating the relationship between certain software elements of an embodiment of the present invention.

Referring to FIG. 2, a group of labels, to be printed by the apparatus show in FIG. 1, is represented by an instance 3 of a label list object. The label list object instance 3 has a labels property which comprises a list of instances 4 of a label object and name, step and repeat properties. The purpose of the step and repeat properties will become apparent from the description of the sequence generators given below.

Each label object instance 4 has an index property, giving its position in the list of label objects, a position property, e.g. x and y co-ordinates, giving the position of the represented label on the printed label sheet, and a definition property. The definition property is a pointer to an instance of a label definition object 5, 6.

Each label definition object instance 5, 6 has a fields property which is a list of instances 7, 8, 9, 10, 11, 12 of field definition object instances. The field definition object classes are polymophically descended from an abstract field definition object class. The field definition object instances 7, 8, 9, 10, 11, 12 can be variable field definition object instances 7, 8, 9, 10, static text field definition object instances 11 or static graphic field definition object instances 12.

Static text field definition object instances 12 have a content property which is a pointer to a string constant, a custom print method and a position property, which gives the field's printing position relative to the label. Static graphic field definition object instances 11 have a content property which is a pointer to a bit map, a custom print method and a position property, which gives the field's printing position relative to the label.

The variable field definition object instances 7, 8, 9, 10 have a content property which is pointer to an instance of a sequence generator object 13, 14, a custom print method and a position property, which gives the field's printing position relative to the label. The variable field definition object instances 7, 8, 9, 10 have additional properties which is a set of column object instance identifiers which identify column object instances 15, 16, 17, 18, 19, 20 of the sequence generator object instances 13, 14 pointed to by the content property and a direct flag property.

In each case above, the custom print method takes an identification of a device context, or the equivalent, as a parameter and prints the field's content to that device context. Consequently, the custom print methods are applicable for both generating real labels and generating representations of labels on a computer screen.

Each sequence generator object instance 13, 14 comprises a columns property. The columns property comprises an ordered list of column object instances 15, 16, 17, 18, 19. Each column object instance 15, 16, 17, 18, 19 has a list of indicia definitions, for example strings. The elements of the column object instances 15, 16, 17, 18, 19 can be accessed using an index value.

Figure 3:
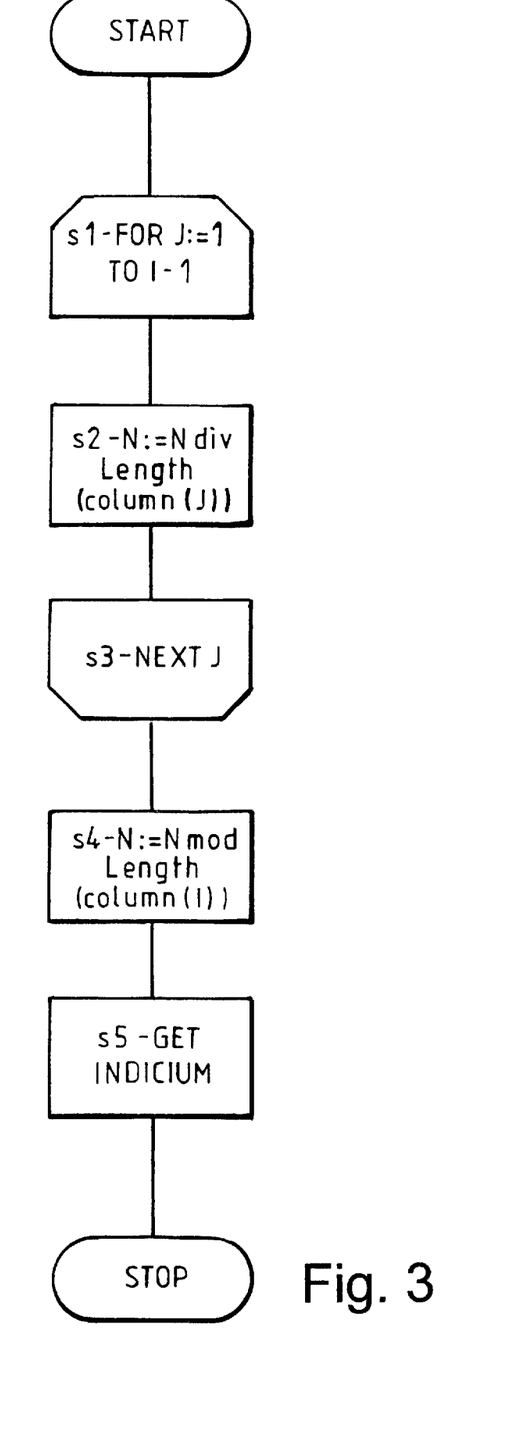
FIG. 3 illustrates an indicia retrieving process.

The sequence generator object instances 13, 14 each have a method that returns an indicium given a column id I and a value N. Referring to FIG. 3, for each column (indexed with variable J) until the column index J equals the I-1 (steps s1 and s3), N is assigned the result of N div Length (column(J)) (step s2). Then, N is assigned the result of N mod Length(column(I)) (step s4). The indicium at the Nth location in the Ith column is then returned by the method (step s5).

Thus, by calling the indicium returning method of a sequence generator object instance 13, 14, a variable field definition object 7, 8, 9, 10 can obtain its contents. If the direct flag is true, the printed content is the string returned by the sequence generator object. However, if the direct flag is false, the printed content is an indicium identified by the returned string, which may be, for example, the filename of a graphics file.

One label printing job may employ a plurality of label list object instances to represent a plurality of label groups on a label sheet. Consequently, different groups of labels may be defined by elements of a plurality of lists which can refer to the same or different label definition object instances. Label definition objects used for different lists may use the discrete or overlapping sets of sequence generator object instances.

Figure 4:
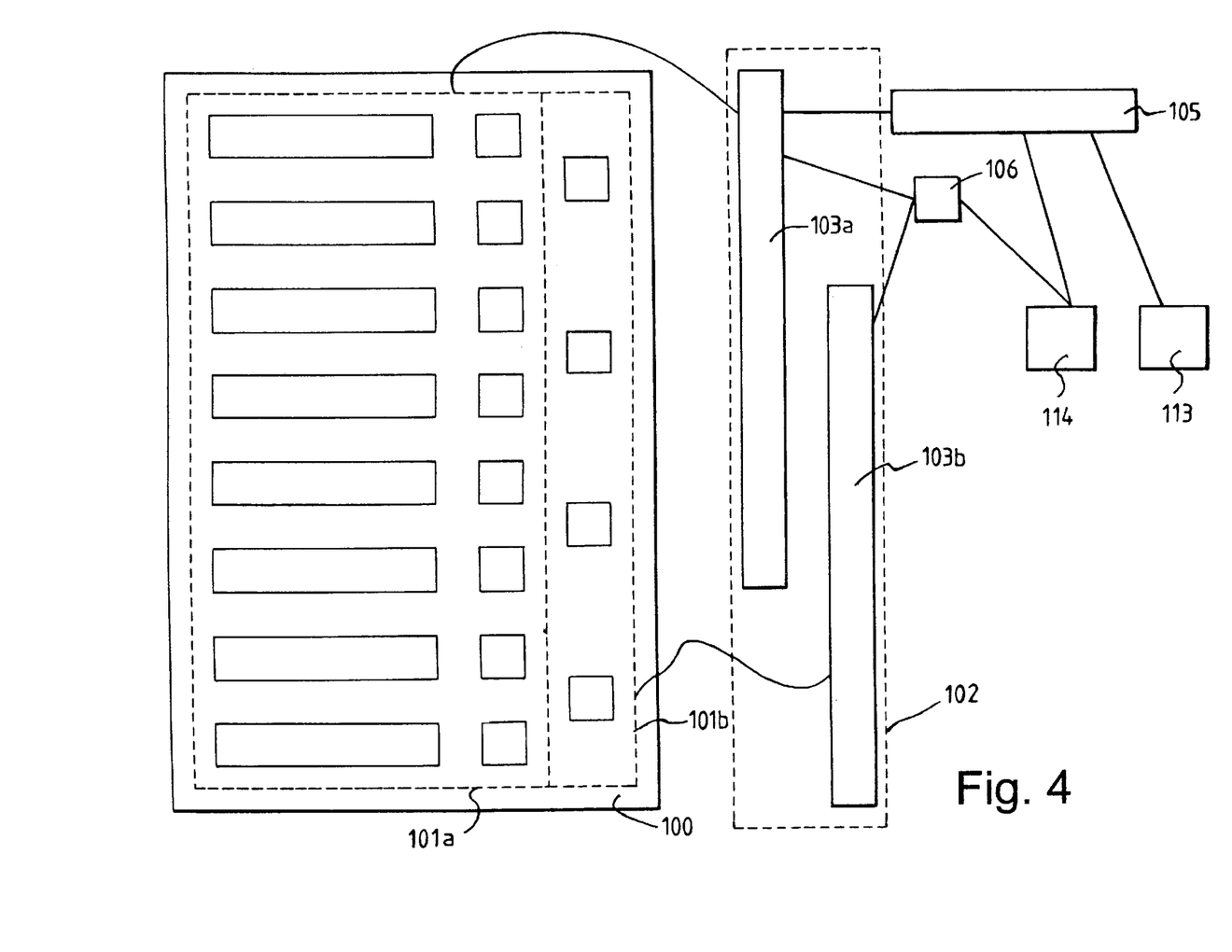
FIG. 4 illustrates the relationship between a label sheet template and label lists and sequence generators.

Thus, by way of example and referring to FIG. 4, the labels on a label sheet 100 may be grouped into first, second and third columns. However, the labels in the first and second columns form one group 101a and are represented by elements of a first label list object instance 103a with alternate elements pointing to first and second label definition object instances 105, 106. The steps value for the first label list object instance is 1 and its repeat value is 2.

The labels in the third column form a second group 101b are represented by elements of a second label list object instance 103b whose elements point to the second label definition object instance 106. The step value for the second label list object instance 103b is 1 and its repeat value is also 1.

The first label definition object instance 105 has two variable field definition object instances which point respectively to first and second single-column sequence generator object instances 113, 114. The second label definition object instance 106 has one variable field definition object instance which points to the second sequence generator object instance 114.

In this example, first and second sequence generator object instances 113, 114 each have only one column. The column of the first sequence generator object instance 113 comprises 001, 002, 003, 004, 005, 006, 007, 008. 009, 010 and the column of the second sequence generator object instance comprises a, W, c, F, z, q, P, h, L , A. It should be noted that the elements of a column need not be inherently ordered.

The label list object instances 103a, 103b are elements of a list comprising a labels property 102 of a job object instance representing a label printing job. The job object instance also has a template property that is associated with a particular label sheet format and which defines the outlines of the labels in the label groups 101a, 101b so that they can be printed to the display window's device context.

The "printing" of the labels defined by the label list objects 103a, 103b will now be described. The process applies to both displaying labels in an image of the label sheet and actually printing the label.

The printing process involves invoking print methods of the various object defining the job in a cascade with the printing parameters being passes down the cascade of method invocations. The printing parameters are passed as a pointer to a printing parameters record variable so that the methods can effect changes thereto. The printing parameter record variable comprises fields for:

1. a device context;
2. a field clip region definition;
3. the co-ordinates of the top left and bottom right corners of the label;
4. vertical and horizontal scaling factors;
5. page number;
6. last page;
7. label list name;
8. label background colour;
9. label outline colour;
10. the label ordinal value;
11. the list step value;
12. the list repeat value;
13. a show template flag; and
14. a printing mode flag.

Values are not assigned to all the fields of the printing parameter fields at the start of a print job. As will become apparent., values are assigned to the fields at the appropriate level within the cascade of print methods.

Figure 5:
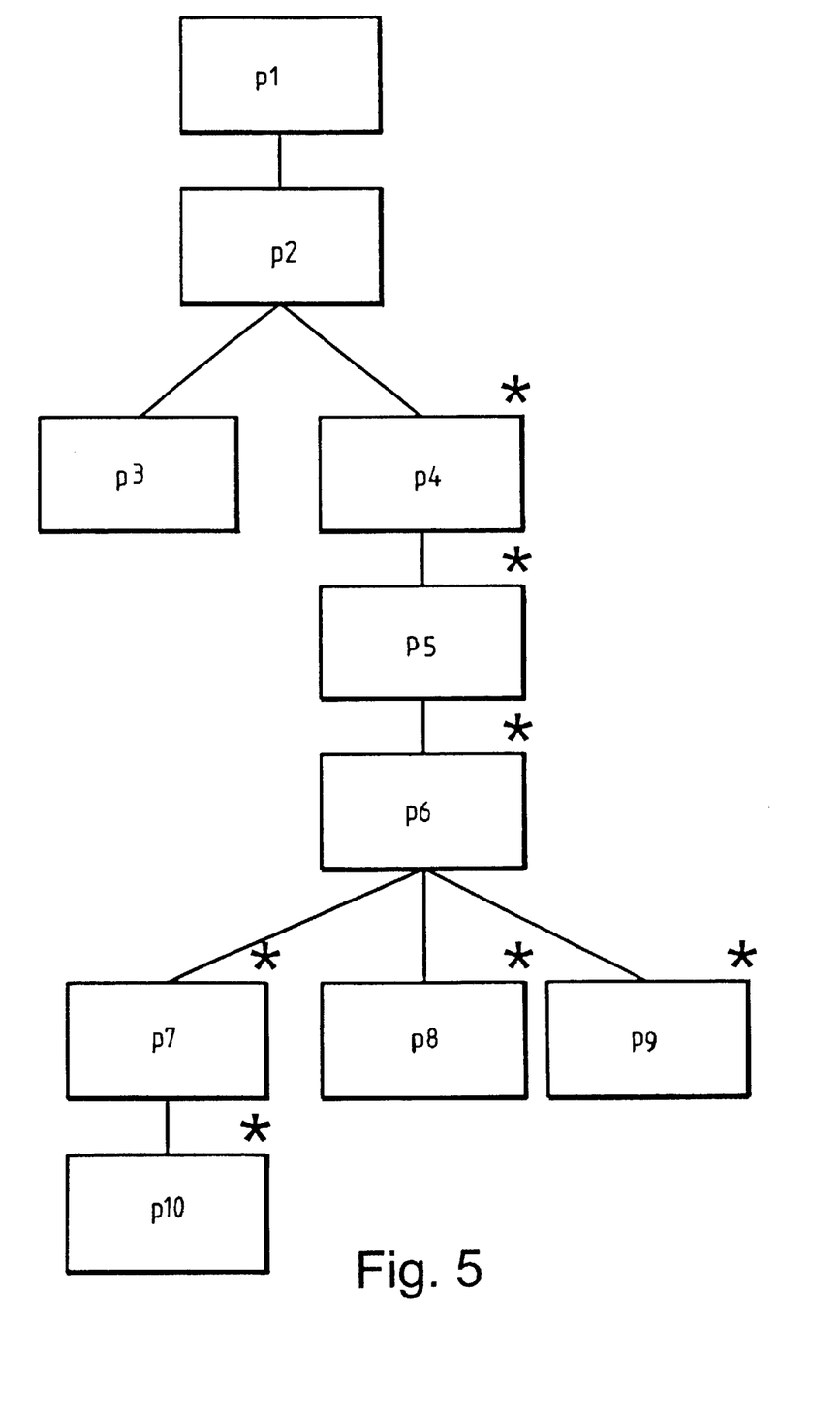
FIG. 5 is a structure chart illustrating the printing of a set labels.

Referring to FIG. 5, in order to display a complete print, the device context field of the printing parameter is set to that of the program's main window, the page number and last page fields are assigned zero, the show template flag is set to true and the printing mode flag is set to false, i.e. printing to the display not to paper (p1). When these fields have been assigned value, and job object instance's print method (p2) is invoked. The job object instance's print method (p2) first prints the template (p3)(i.e. label outlines to the program's main window).

The job object instance then invokes the print method (p4) of the label lists object instance 102 and then increments the page number field of the printing parameter. This is repeated until the page number field value is greater then the last page field value.

The print method (p4) of a label list object instance 102 invokes the print method (p5) of the list object instances 103a, 103b. The label list object print method (p5) first sets the step and repeat fields of the print parameter to the step and repeat property values of the label list object instance 103a, 103b and the top left position field to the position property of the current list element. The labels represent in the list may extend over several pages. Consequently, before the print method of the label definition object instance 105, 106 for a list element is invoked, the ordinal value field (ov) of the printing parameter is set to the result of the following:

$$ov = (p \times l) + n$$

where p is the page number, which is zero-based, l is the list length and n is the position of the current label in the list.

When the print method (p6) of an label definition object instance 105, 106 is invoked, it first calculates a modified ordinal value (ov') for the current label according to the formula:

$$ov' = (((ov-1) \operatorname{div} r) \times s) + 1$$

where r is the label list object instance's repeat property and s is its step property.

This formula assumes that the ordinal value counts from 1 not 0. Then it invokes the print methods (p7, p8, p9) of the associated field definition object instances in turn.

The print method (p7) of a variable field object instance invokes the indicium returning method (p10) of the relevant sequence generator object instance 113, 114 with the modified ordinal value (ov') and "1", indicating the only column of the sequence generator object instance 114, as parameters. This method then returns an indicium by the process described above.

If a field makes use of more than one column of a sequence generator object instance, the indicium returning method must invoke the indicium returning method (p10) a plurality of times. The results are then combined for printing. In the case of strings, the results may be concatenated in a user-definable order.

Once the indicia has been obtained, the field definition object instance print method prints the indicium to the notified device context, using the colour, position and clip area information provided in the printing parameter passed to it.

The print method (p8) of any static graphic field definition objects are then invoked. This method "prints" the graphic to the device context using the colour, position and clip area information provided in the printing parameter passed to it.

Finally, the print method (p9) of any static text field definition objects are then invoked. This method "prints" the text to the notified device context using the colour, position and clip area information provided in the printing parameter passed to it.

Figure 6:
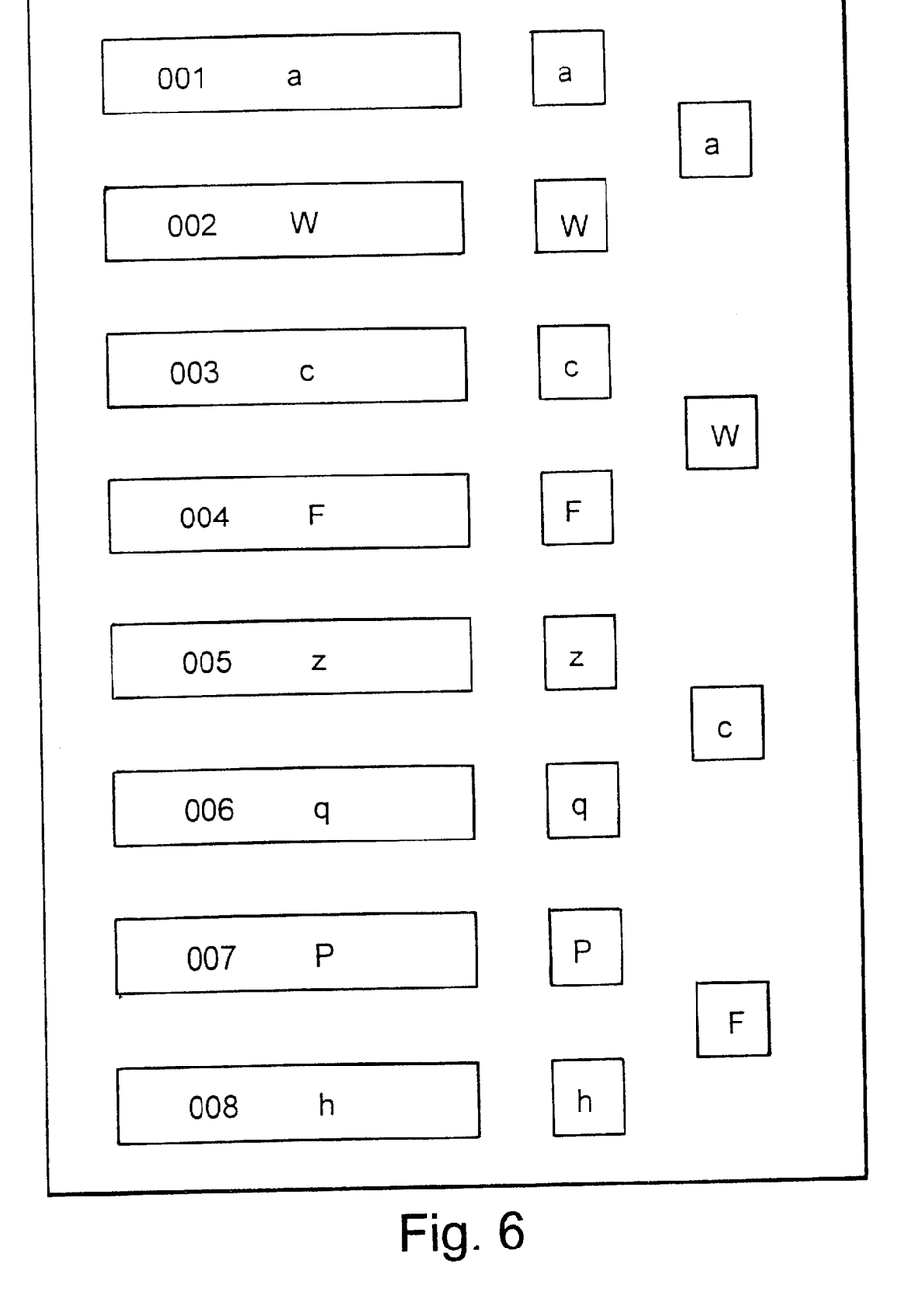
FIG. 6 shows a printed sheet of labels.

The printed sheet produced by the process described above is shown in FIG. 6.

Printing to label sheets is essentially the same save that a "printer" device context is supplied, the show template flag is set to false and the print type flag is set to true, indicating printing to a label sheet, so that the printing of page numbers and headers and footers can be performed.

The print methods do not need to be invoked using the whole cascade. For instance, a printing parameter can be built and passed directly to the printing method of a label definition object instance so that an individual label can be displayed. This ability is useful for providing a graphical label design user interface.

From the foregoing, it will be appreciated that a great deal of control can be had over the label printing process. Accordingly, the present embodiment is provided with user interface provision for setting and selecting various features.

The user interface for the present embodiment comprises a main window from which a plurality of task-specific dialogs can be called up.

Firstly, the user can call up a dialog for selecting a template definition from a set of files defining templates. Once a template has been selected, it is displayed by invoking the job print method as described above. This will simply display the shapes of the labels because no label definitions have been added.

At this stage all of the labels are in a single list. Therefore, a dialog is provided whereby the user can define additional label lists and move labels between lists.

Another dialog is provided so that a user can build sequence generators using automatically generated ordinal sequences or sequences entered manually element by element to create the columns. A user may also manually modify automatically generated sequences, for instance to remove the numbers 4 or 13.

A label design dialog displays a single selected label, using the individual print process described above, and allows the user to position static and variable fields. The variable fields can be associated with columns of a sequence generator by a drag and drop process from the sequence generator building dialog. In this way, the label, field and sequence generator object instances can be created and linked.

Changes made using these dialogs are reflected in the displayed label sheet image.

When the labels meet the user's requirements, the user can print the labels using a conventional printer and prepared label sheets. The user can also save the definitions of the template, labels and sequence generators in a file so that the job can be recreated at a later date.

Additional fields may be added to the printing parameter record so that richer printing options may be provided. For instance, a list view flag may be provided so that labels can be printed to the program's window with their list names and ordinal values rather than the data fields.

The sequence generator objects may be modified so that the indicium returning methods return pointers to printable objects, preferably having a common ancestor type but custom print methods. Consequently, graphic and text indicia may be mixed in one sequence.

I claim:

1. A system for displaying a sequence of indicia, the system comprising:

indicia selection means; and output means for producing command signals for a display apparatus; and wherein the indicia selection means comprises a list whose members each define an indicium and is configured to perform a process for selecting a member of said list in dependence on a supplied index value derived from an ordinal value related to a display region in which an indicium in said list is to be displayed; and wherein the output means is configured for generating and supplying said values to said process for selecting list members and generating display apparatus control signals for displaying the indicia defined by the selected list members.

2. The system according to claim 1, wherein the display apparatus control signals are printer control signals.

3. The system according to claim 1, wherein the display apparatus control signals are display screen control signals.

4. The system according to claim 1 wherein the indicia selection means comprises a software object comprising said list and a method for obtaining a position in said list in dependence on said supplied value.

5. The system according to claim 2 wherein the indicia selection means comprises a software object comprising said list and a method for obtaining a position in said list in dependence on said supplied value.

6. The system according to claim 3 wherein the indicia selection means comprises a software object comprising said list and a method for obtaining a position in said list in dependence on said supplied value.

7. The system according to claim 4, wherein the indicia selection means comprises a further list, whose members each define an indicium, and the selection means is configured to perform said process for obtaining a position in said further list in dependence on a supplied value, said lists being arranged in an ordered manner.

8. The system according to claim 7, wherein said lists have different numbers of members.

9. The system according to claim 7 wherein said process comprises, for each list until the list before that from which position is required, assigning the result of N div the length of the current list to N and then obtaining the result of N mod the length of the list from which the position is required as the required position, where N is initially the supplied value.

10. The system according to claim 8 wherein said process comprises, for each list until the list before that from which position is required, assigning the result of N div the length of the current list to N and then obtaining the result of N mod the length of the list from which the position is required as the required position, where N is initially the supplied value.

11. The system according to claim 1 wherein the ordinal value is the position of a display region in an array of display regions.

12. The system according to claim 2 wherein the ordinal value is the position of a display region in an array of display regions.

13. The system according to claim 3 wherein the ordinal value is the position of a display region in an array of display regions.

14. The system according to claim 4 wherein the ordinal value is the position of a display region in an array of display regions.

15. The system according to claim 5 wherein the ordinal value is the position of a display region in an array of display regions.

16. The system according to claim 6 wherein the ordinal value is the position of a display region in an array of display regions.

17. The system according to claim 7 wherein the ordinal value is the position of a display region in an array of display regions.

18. The system according to claim 8 wherein the ordinal value is the position of a display region in an array of display regions.

19. The system according to claim 9 wherein the ordinal value is the position of a display region in an array of display regions.

20. The system according to claim 10 wherein the ordinal value is the position of a display region in an array of display regions.

21. The system according to claim 2, wherein the display region is a label.

22. The system according to claim 3, wherein the display region is a representation of a label.

23. The system according to claim 21 including means storing step and repeat values associated with a label group, wherein the output means is configured to generate said supplied values using the stored step and repeat values associated with the group of the label being displayed and said ordinal value.

24. The system according to claim 22 including means storing step and repeat values associated with a label group, wherein the output means is configured to generate said supplied values using the stored step and repeat values associated with the group of the label being displayed and said ordinal value.

25. A method of producing a display of an indicium in a sequence of indicia, the method comprising:
   selecting an indicium definition from a list of indicium definitions in dependence on a supplied index value derived from an ordinal value related to a display region in which the indicium is to be displayed; and
   producing display apparatus control signals for causing a display device to display the indicia defined by the selected definition.

26. The method according to claim 25, wherein the display apparatus control signals are printer control signals.

27. The method according to claim 25, wherein the display apparatus control signals are display screen control signals.

28. The method according to claim 25 wherein the indicium definition is selected by invoking a method of a software object instance having a property comprising said list, said object's method obtaining a position in said list in dependence on said supplied value.

29. The method according to claim 26 wherein the indicium definition is selected by invoking a method of a software object instance having a property comprising said list, said object's method obtaining a position in said list in dependence on said supplied value.

30. The method according to claim 27 wherein the indicium definition is selected by invoking a method of a software object instance having a property comprising said list, said object's method obtaining a position in said list in dependence on said supplied value.

31. The method according to claim 28, wherein said object has a further list of variables, each defining an indicium, said lists of variables are ordered, and the object's method selectively obtains a position in said further list in dependence on a supplied value.

32. The method according to claim 31, wherein said lists have different numbers of members.

33. The method according to claim 31 wherein said object's method comprises, for each list until the list before that from which position is required, assigning the result of N div the length of the current list to N and then obtaining the result of N mod the length of the list from which the position is required as the required position, where N is initially the supplied value.

34. The method according to claim 32 wherein said object's method comprises, for each list until the list before that from which position is required, assigning the result of N div the length of the current list to N and then obtaining the result of N mod the length of the list from which the position is required as the required position, where N is initially the supplied value.

35. The method according to claim 25 wherein the ordinal value is the position of a display region in an array of display regions.

36. The method according to claim 26 wherein the ordinal value is the position of a display region in an array of display regions.

37. The method according to claim 27 wherein the ordinal value is the position of a display region in an array of display regions.

38. The method according to claim 28, wherein the ordinal value is the position of a display region in an array of display regions.

39. The method according to claim 31 wherein the ordinal value is the position of a display region in an array of display regions.

40. The method according to claim 32 wherein the ordinal value is the position of a display region in an array of display regions.

41. The method according to claim 32 wherein the ordinal value is the position of a display region in an array of display regions.

42. The method according to claim 26, wherein the display region is a label.

43. The system according to claim 27, wherein the display region is a representation of a label.

44. The method according to claim 42 further comprising storing step and repeat values associated with a group of labels and generating said supplied values using the stored step and repeat values associated with the group of the label being displayed and said ordinal value.

45. The method according to claim 43 further comprising storing step and repeat values associated with a group of labels and generating said supplied values using the stored step and repeat values associated with the group of the label being displayed and said ordinal value.

* * * * *